United States Patent [19]

Dugge

[11] Patent Number: 5,232,315
[45] Date of Patent: Aug. 3, 1993

[54] END ADAPTER FOR RAILCAR PNEUMATIC OUTLET

[75] Inventor: Richard H. Dugge, Des Peres, Mo.

[73] Assignee: ACE Industries, Incorporated, Earth City, Mo.

[21] Appl. No.: 899,708

[22] Filed: Jun. 17, 1992

[51] Int. Cl.$^5$ .............................................. B65G 53/24
[52] U.S. Cl. .................................... 406/145; 105/247; 285/48; 285/63
[58] Field of Search ............. 406/145, 131, 129; 105/247, 248, 358, 360; 285/47, 48, 53, 63, 260

[56] References Cited

U.S. PATENT DOCUMENTS

| | | | |
|---|---|---|---|
| 3,194,420 | 7/1965 | Kemp et al. | 214/83.28 |
| 3,663,066 | 5/1972 | Fischer et al. | 406/145 X |
| 3,778,114 | 12/1973 | Carney, Jr. et al. | 302/52 |
| 3,797,891 | 3/1974 | Fritz | 406/145 X |
| 4,114,785 | 9/1978 | Dugge | 222/545 |
| 4,151,935 | 5/1979 | Dugge | 406/145 X |
| 4,163,585 | 8/1979 | Hammonds | 406/145 |
| 4,312,607 | 1/1982 | Van Auken | 406/145 X |
| 4,345,859 | 8/1982 | Robertson | 406/145 X |
| 4,411,560 | 10/1983 | McComb | 406/145 X |
| 4,500,230 | 2/1985 | Bateson | 406/145 X |
| 4,718,795 | 1/1988 | Dugge | 406/30 |
| 4,867,615 | 9/1989 | Fritz | 406/145 X |
| 4,934,877 | 6/1990 | Haverick et al. | 406/145 X |
| 4,975,000 | 12/1990 | Fritz et al. | 406/145 |

*Primary Examiner*—Dennis H. Pedder
*Assistant Examiner*—James M. Kannofsky
*Attorney, Agent, or Firm*—Polster, Lieder, Woodruff & Lucchesi

[57] ABSTRACT

An adapter (10) is useful to prevent formation of a static electrical change on an outlet valve (V) during discharge of lading from a railcar on which the valve is installed. A unitary member (12) has an inlet end (14) formed for attachment to the outlet valve, and an outlet end (16) formed for connection with a hose (H) into which discharged lading flows. A passage (28) is formed in the member and extends from the inlet end to the outlet end. The passageway is of an irregular shape at the inlet end of the adaptor. It is of a generally circular shape at its outlet end. The member is formed of an electrically non-conductive, resilient material so that it prevents the build-up of any static electrical charge as lading flows through the member.

11 Claims, 3 Drawing Sheets

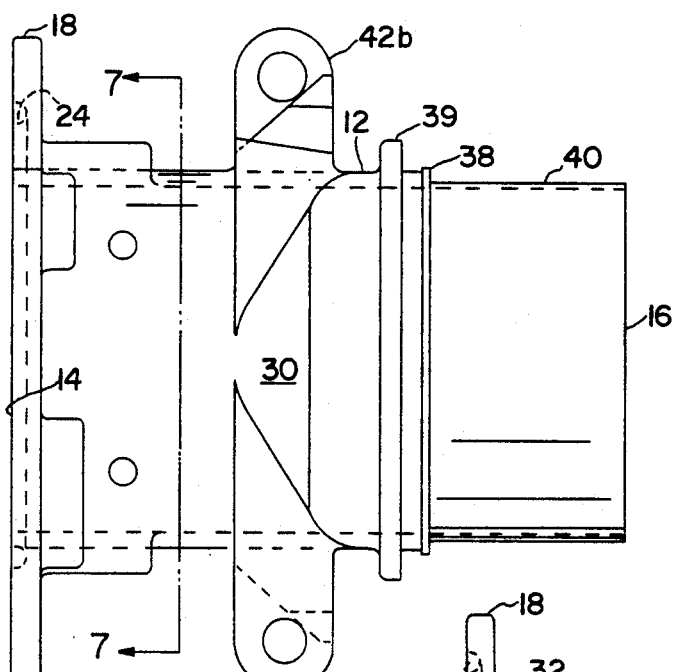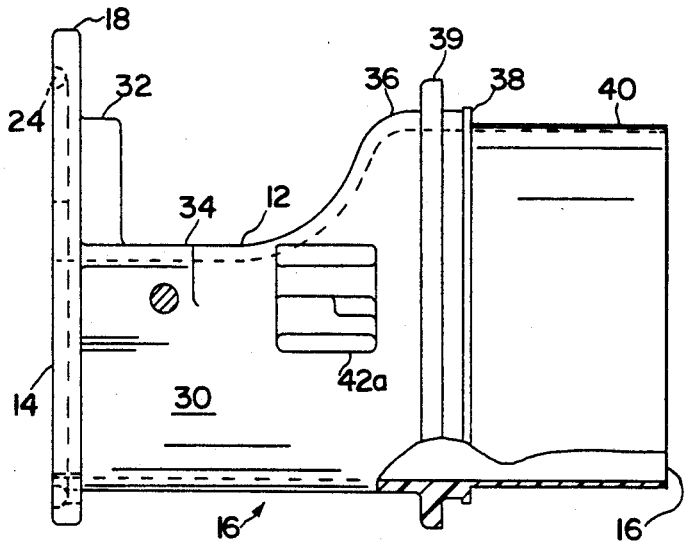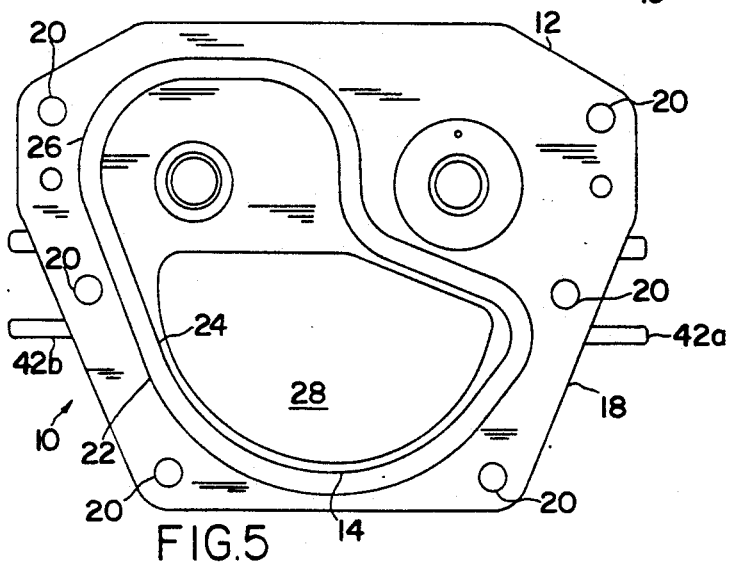

END ADAPTER FOR RAILCAR PNEUMATIC OUTLET

BACKGROUND OF THE INVENTION

This invention relates to pneumatic outlets for covered hopper railcars and, more particularly, to an end adapter which fits onto the discharge end of the outlet.

Pneumatic outlets for covered hopper railway cars are well known in the art. See, for example, U.S. Pat. Nos. 4,114,785, 3,778,114, and 3,194,420, which are assigned to the same assignee as the present invention. Various types of granular or pelletized ladings are carried in hopper cars and are discharged from the car through these outlets. Such discharge involves connecting a hose to the outlet and creating an airstream in which the lading is entrained. With some ladings, plastic pellets, for example, the brushing or contact between the pellets and the outlet creates a charge of static electricity that is potentially dangerous. If the charge is not bled off by grounding the outlet, the charge may produce a spark which, in the right environment, could create a fire or cause an explosion. Because of this hazard, it would be advantageous to insulate the outlet so no charge is formed in the first place. Further, static electricity build-up may occur if a metal base is used, or if a metal reinforced hose is used and the metal is, for some reason, exposed. The conveying hose may loosely slip into a metal nozzle. Often, there is a gap between the hose and outlet which could result in a spark being produced.

In addition, if a short circuit condition exists in the offloading equipment, the short may find a path through the hose/valve connection, through the truck and truck wheels of the car, to ground. Such a condition is not only dangerous to persons using the equipment or working around the car, but may also damage the wheel bearings, for example, which may form part of the resultant circuit path through the car. Again, if the outlet were insulated, this condition may be prevented.

SUMMARY OF THE INVENTION

Among the several objects of the present invention may be noted the provision of an adapter for use on a pneumatic outlet valve installed on covered hopper railway cars; the provision of such an adapter which is easily installed on the outlet end of the valve; the provision of such an adapter which is non-deformable so as to facilitate connection of a hose to the outlet; the provision of such an adapter which is fabricated of a electrically non-conductive material so to prevent short circuit conditions in unloading equipment from being transmitted through the car damaging the car or injuring people around it; the provision of such an adapter to prevent a buildup of static electricity and the occurrence of sparks during connection and disconnection of the hose from the outlet valve; the provision of such an outlet which is usable on different types of outlet valves; and, the provision of such an adapter which is low cost, and readily replaced if damaged.

In accordance with the invention, generally stated, an adapter is for installation on a railway car outlet valve. The adapter is to prevent formation of a static electrical charge on the outlet valve during discharge of lading from the railcar and to isolate the railcar from offloading equipment electrical problems. A unitary member has an inlet end formed for attachment to one end of the outlet valve, and an outlet end formed for connection with a hose into which discharged lading flows. A passage is formed in the member and extends from the inlet end to the outlet end. The passageway is of an irregular shape at the inlet end of the adapter. It is of a generally circular shape at the adapter's outlet end. The member is formed of an electrically non-conductive material thereby to prevent the build-up of any static electrical charge as lading flows through the member. Other objects and features will be in part apparent and in part pointed out hereinafter.

BRIEF DESCRIPTION OF THE DRAWINGS

FIG. 3 is a top plan view of the adapter used on another type of outlet valve;

FIG. 4 is a side elevational view thereof partly in section;

FIG. 5 is an end view of the inner end of the adapter;

Corresponding reference characters indicate corresponding parts throughout the drawings.

DESCRIPTION OF A PREFERRED EMBODIMENT

Figure 1:
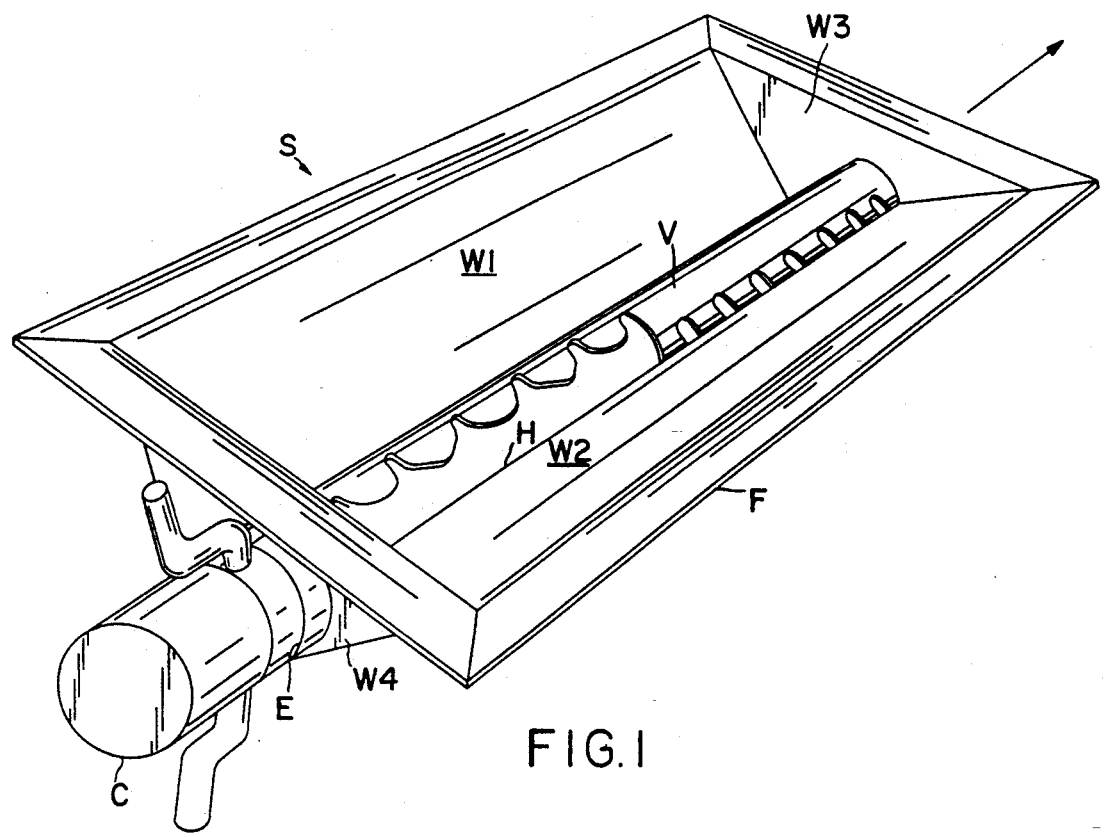
FIG. 1 is a perspective view of one type of hopper car pneumatic outlet valve with which the adapter of the present invention is used.
Figure 2:
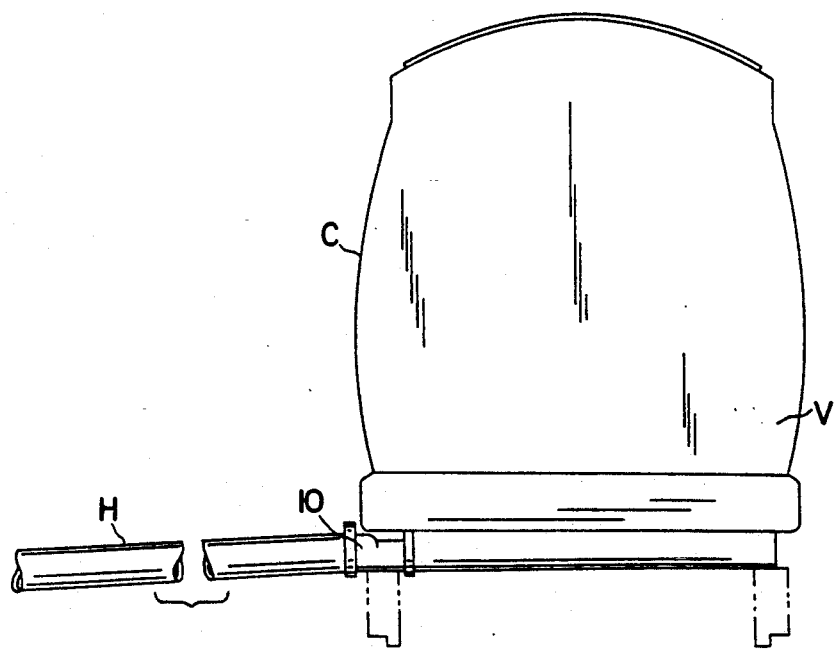
FIG. 2 illustrates use of the adapter installed on an outlet during an unloading operation.

Referring to the drawings, a covered hopper railcar R has a number of hoppers in which a lading, for example a pelletized lading, is transported. An outlet valve V is installed at the bottom of each section for off-loading the lading. As shown in FIG. 1, an outlet structure S includes respective sidewalls W1, W2, and end walls W3, W4 which slope downwardly from a flange F. Flange F is connected to a mating flange at the bottom of each hopper. A semi-circular housing X is formed at the bottom of these walls and valve V is installed in this housing. A sleeve E extends outwardly from both sides of the housing and a cap C fits over the outer end of each sleeve. The cap is removable for connection of a vacuum hose H (see FIG. 2) to the outlet structure. When the hose is connected and the valve opened, lading in a hopper is pneumatically unloaded from the car.

Movement of certain types of lading such as the pelletized lading referred to above may produce charges of static electricity at the valve/hose connection. If a static charge is created, the resultant spark which occurs when it discharges could cause an explosion. Or, if there is a short circuit in the unloading equipment, this may be routed through the valve structure and railcar to ground. This situation is potentially dangerous to individuals and harmful to wheel bearings, for example, of the railcar.

To prevent the above conditions from happening, an adapter 10 of the present invention is for use on the outlet valve. The adapter comprises a unitary member 12 having an inlet end 14 formed for attachment to one end of the outlet valve, and an outlet end 16 formed for connection with the hose H into which discharged lading flows. Member 12 is formed of an electrically non-conductive material. This prevents the build-up of any static electrical charge as lading flows through the adapter.

Further, the member is a molded member, and the material of which the member is formed is a resilient material. This permits the adapter to withstand the connection and disconnection of hose H at the beginning and end of an unloading operation.

The adapter has a circumferential flange 18 formed at the inlet end of member 12. The flange is formed such that its shape conforms to the outer end of the valve structure. Further, the flange has a plurality (six as shown in FIG. 5) spaced holes 20 whose location conforms to the bolt pattern on the structure. This allows the adapter to be bolted to the outlet structure. The adapter includes seal means 22 for sealingly attaching the member to the outlet valve structure. This seal means includes an annular groove 24 formed in the abutting face of flange 18. A seal such as an O-ring type seal 26 is installed in the groove and seals the adapter with the outlet valve. Use of the seal is important because many ladings carried in hopper cars are subject to rigid purity requirements. The present of even a few particles of another material in the off-loaded lading may be sufficient to destroy its value. Seal 26 therefore prevents particles from one lading from being lodged at the valve/adapter interface and contaminating a subsequent lading.

Figure 6:
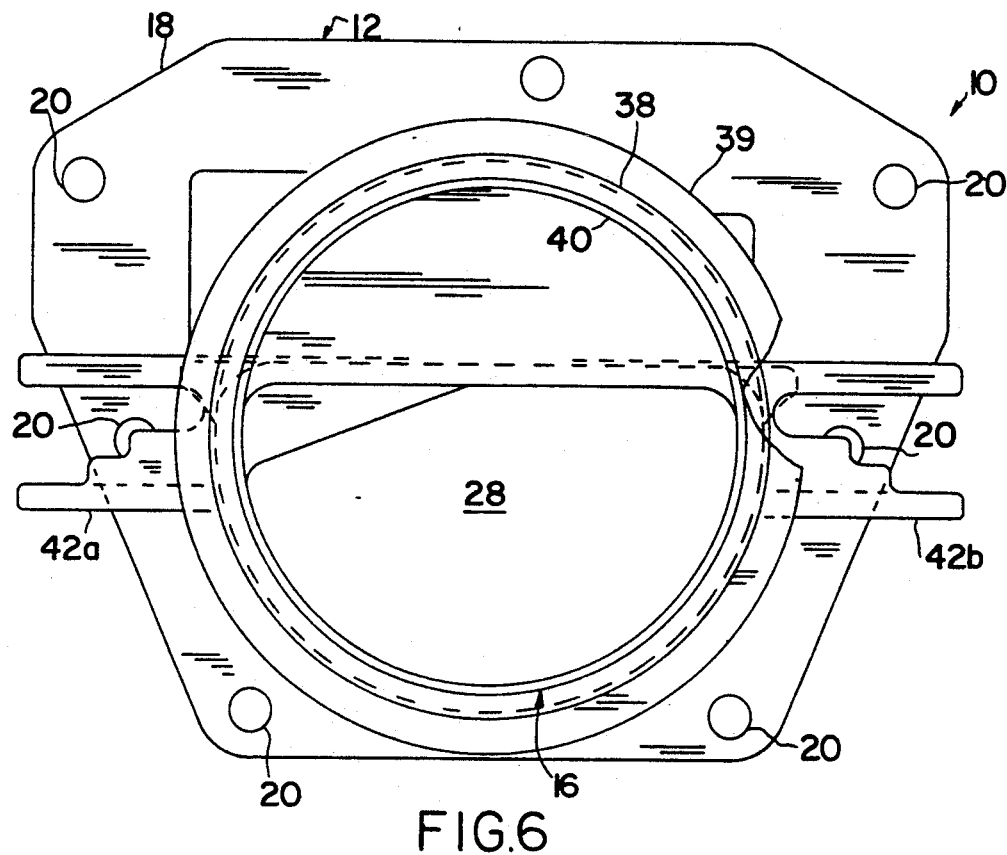
FIG. 6 is an end view of the outer end of the adapter.
Figure 7:
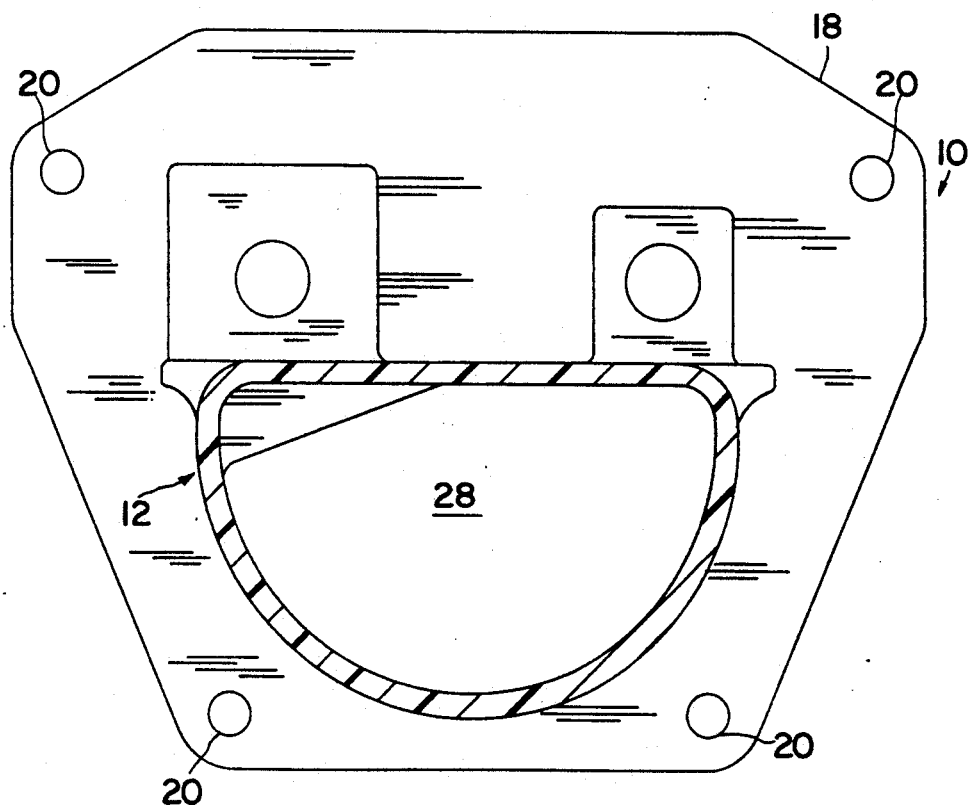
FIG. 7 is a sectional view of the adapter taken along line 7—7 in FIG. 3.

A flow passageway 28 is formed in member 12. The passageway extends from the inlet to outlet end of the member. As seen in FIG. 5, passageway 28 has an irregular shape at its inlet end. The contour of groove 24 corresponds to the outline of the inlet end to the passageway. The passageway has a generally circular shape at its outlet end as shown in FIG. 6. Accordingly, member 12 has an intermediate section 30 which provides a transition area for passageway 28 to change from its generally irregular shape at the inlet end of the member to its generally circular shape at its outlet end. As shown in FIG. 4, section 30 has an inner section 32 of relatively short length adjacent the inlet end of the adapter. Next is a central section 34 which comprises the greatest portion of the length of section 30. Lastly is an outer section 36. Section 34, as shown in FIG. 7, is semi-circular in cross-section. The flow area of this central section is substantially smaller than that at either end of the adapter. At the outer end of passageway 28, section 36 provides a transition from the flow area of section 34 to the larger cross-sectional area of the adapter outlet.

Also with respect to FIG. 4, it will be noted that the base of adapter 10 is uniform throughout the length of the member; that is, the radius of the lower portion of passageway 28 is constant along the length of the passageway. However, the contour of the upper portion of the passageway varies so that the passageway has different cross-sectional areas as described above.

Hose H is installable on the outer end of adapter 10 in the same manner it is installed on a conventional outlet. For this purpose, a circumferential shoulder 38 and a circumferential flange 39 are formed inwardly of the outer end of member 12. Consequently, the outer end of the member comprises a sleeve 40 over which the hose fits when it is installed on the adapter. The length of the sleeve corresponds to the length of hose attached, and shoulder 38 forms an abutting surface or stop for the end of the hose. Inwardly of shoulder 38 are a pair of opposed ears 42*l*, 42*b*. These ears extend outwardly from the outer face the member, have upper and lower ear segments in each of which an opening is formed, and are used to secure the hose to the adapter. Similarly, when the hose is removed and a cap C is installed over the end of the adapter, the ears are used to hold the cap in place.

What has been described is an adapter for use on an outlet valve which is particularly useful in preventing the build-up of static electrical charges during unloading of a railway car, and in preventing electrical faults present in the unloading equipment from effecting the railcar. To this end, the adapter is made of a resilient, non-electrically conductive material. The adapter is readily installed on the outer end of a valve structure and withstands repeated use. In use, the adapter functions in the same way as conventional valve outlets, accommodating both installation of a hose for unloading operations, and a protective cap at other times. The adapter also prevents contamination of ladings in the same manner as conventional outlets. If damaged, the adapter is readily replaceable.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. An adapter on a railway car outlet valve for preventing the formation of a static electrical charge on the outlet valve during discharge of lading from the railcar comprising:

a unitary member having an inlet end attached to one end of the outlet valve, and an outlet end connected with an end of a hose into which discharged lading flows;

a passageway in said member and extending from said inlet end to said outlet end, said passageway being of an irregular shape at said inlet end and of a generally circular shape at said outlet end; and, said member is formed of an electrically non-conductive material thereby to prevent the build-up of any static electrical charge as lading flows through the member.

2. The adapter of claim 1 wherein said member is a molded member and the material of which the member is formed is a resilient material.

3. The adapter of claim 1 including a circumferential flange at the inlet end of said unitary member, a face of said flange abutting against said outlet valve for the attachment of said member thereto.

4. The adapter of claim 3 further include seal means for sealingly attaching said member to said outlet valve.

5. The adapter of claim 4 wherein said seal means includes an annular groove formed in the abutting face of said flange, a seal of said seal means received in said groove to seal an interface between said member and said outlet valve.

6. The adapter of claim 1 wherein the member has an intermediate section through which said passageway extends, said intermediate section providing a transition area for the passageway to change from said generally irregular shape at the inlet end of the circular shape at its outlet end.

7. The adapter of claim 6 further including opposed ears extending outwardly from an outer face of said intermediate section for securing the hose to said member.

8. The adapter of claim 6 wherein said passageway has an inner section, a central section, and an outer section, said central section having a smaller cross-sectional flow area than flow areas at the inner and outer sections.

9. The adapter of claim 8 further including a circumferential shoulder spaced inwardly from said outlet end of said member a distance corresponding to the end of said hose attached to said outlet end, said shoulder forming an abutting surface for sad end of said hose.

10. The adapter of claim 8 wherein said member has a lower portion of uniform radius throughout the length of the member.

11. The adapter of claim 10 wherein said central section is semi-circular in cross-section.

* * * * *